US009756494B2

(12) United States Patent
Parlamas et al.

(10) Patent No.: US 9,756,494 B2
(45) Date of Patent: Sep. 5, 2017

(54) METHOD AND SYSTEM FOR PROVIDING A SERVICE AT A CURRENT LOCATION

(71) Applicant: AT&T Intellectual Property I, L.P., Atlanta, GA (US)

(72) Inventors: Stephanie Parlamas, Colts Neck, NJ (US); Sergio Kadi, Panama City Beach, FL (US); Feza Buyukdura, Fairview, TX (US); Vimal Patel, Morganville, NJ (US); Dwayne Crawford, Indianapolis, IN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/633,775

(22) Filed: Feb. 27, 2015

(65) Prior Publication Data
US 2016/0255483 A1 Sep. 1, 2016

(51) Int. Cl.
*H04M 11/04* (2006.01)
*H04W 4/22* (2009.01)

(52) U.S. Cl.
CPC .................. *H04W 4/22* (2013.01)

(58) Field of Classification Search
CPC ..... H04W 76/007; H04W 4/22; H04W 60/00; H04L 29/08108
USPC ..................... 455/404.1–404.2, 414.1, 435.1
See application file for complete search history.

(56) References Cited

U.S. PATENT DOCUMENTS

| | | | |
|---|---|---|---|
| 8,059,633 B2 * | 11/2011 | Heidermark et al. | 370/352 |
| 8,929,912 B1 * | 1/2015 | Chitre | G08B 25/016 455/456.1 |
| 2008/0317234 A1 * | 12/2008 | Di Fabbrizio et al. | 379/211.01 |
| 2009/0003312 A1 * | 1/2009 | Velazquez et al. | 370/352 |
| 2009/0264064 A1 * | 10/2009 | Hyun | H04L 12/189 455/3.06 |
| 2010/0027469 A1 * | 2/2010 | Gurajala et al. | 370/328 |
| 2013/0090086 A1 * | 4/2013 | Lopez Lopez | 455/410 |
| 2013/0244609 A1 * | 9/2013 | Velusamy | H04W 4/22 455/404.1 |
| 2015/0052451 A1 * | 2/2015 | Cueto | 715/752 |
| 2015/0312738 A1 * | 10/2015 | Deich et al. | 370/328 |

* cited by examiner

*Primary Examiner* — Kamran Afshar
*Assistant Examiner* — Matthew Genack (57) ABSTRACT

A processor receives a request to access the service via the software client. The processor sends to a network service provider a request for validation of a current location as to a coverage of an emergency service, when the current location was not previously validated for the coverage of the emergency service. The processor determines whether a response is received from the network service provider, indicating that the current location is validated for the coverage of the emergency service, wherein the response includes an address identifier associated with the current location for accessing the emergency service. The processor performs a registration with the network service provider via the software client at the current location, when the response is received indicating that the current location is validated for the coverage of the emergency service and enables the user to access the service via the software client at the current location.

18 Claims, 8 Drawing Sheets

METHOD AND SYSTEM FOR PROVIDING A SERVICE AT A CURRENT LOCATION

The present disclosure relates generally to providing a service to a user at a current location via a software client, e.g., a softphone client. The user may be accessing network services, e.g., Long Term Evolution (LTE) network based services via the softphone.

BACKGROUND

When a user dials an emergency service number, e.g., 911 in North America, a 911 or E911 system links the user to a Public Safety Answering Point (PSAP) which has a jurisdiction over the location from which the call originates. The user may also be referred to as the caller or the calling party. In order to identify the particular PSAP to which the call should be directed, the system first associates a location, e.g., a physical location, with the call. For calls originated via wire based telephone, the location is a fixed address associated with the telephone number. For calls originated via a wireless device, the location is a latitudinal & longitudinal coordinate of a physical location from which the user is calling via the wireless device.

SUMMARY OF THE DISCLOSURE

In one embodiment, the present disclosure describes a method and an apparatus for providing a service to a user via a software client. For example, a processor executing the method receives a request from the user to access the service via the software client, sends to a network service provider a request for validation of a current location as to a coverage of an emergency service, when the current location was not previously validated for the coverage of the emergency service, determines whether a response is received from the network service provider, indicating that the current location is validated for the coverage of the emergency service, wherein the response includes an address identifier associated with the current location for accessing the emergency service, performs a registration with the network service provider via the software client at the current location, when the response is received indicating that the current location is validated for the coverage of the emergency service and enables the user to access the service via the software client at the current location.

BRIEF DESCRIPTION OF THE DRAWINGS

The teaching of the present disclosure can be readily understood by considering the following detailed description in conjunction with the accompanying drawings, in which:

FIG. 3 (shown as FIG. 3A, FIG. 3B and FIG. 3C) illustrates a detailed flowchart of an example method for providing a service to a user at a current location via a softphone client;

FIG. 4 (shown as FIG. 4A and FIG. 4B) illustrates a flowchart of an example method of the present disclosure for processing 911 calls by a network service provider.

To facilitate understanding, identical reference numerals have been used, where possible, to designate identical elements that are common to the figures.

DETAILED DESCRIPTION

A software client, e.g., a softphone, enables users to access services to which they subscribe over a network, e.g., an LTE network. For example, a user may subscribe to a Voice over LTE (VoLTE) or a video over LTE service. The user may then access the VoLTE or video over LTE service by using a softphone client, either from a personal computer (PC) or a computing tablet. However, software clients lack radio access network (RAN) technologies that are required for location identification. For example, cell phones are equipped with either a phase I or a phase II location identification technology. In contrast, the softphone clients lack such location identification technologies. From a service and Public User Identifier (PUID) perspective, the softphone clients are associated with a mobility account. One way to attempt to support 911 services is by associating the PUIDs with an address in a Location Information Server (LIS).

Unfortunately, the user may access the VoLTE service via any number of softphones deployed in various devices. Since the softphones and the associated VoLTE devices, e.g., the mobile phone, may be in different locations while being associated with the same phone number, the current location of the user may not be determinable by simply associating the PUID with an address in the LIS.

The present disclosure broadly describes a method and a system for providing a service to a user at a current location via a software client, e.g., a softphone client. Although the teachings of the present disclosure are discussed below in the context of a VoLTE service, the teaching is not so limited. Namely, the teachings of the present disclosure can be applied for any softphone services that are accessed via any Internet Protocol based network. Namely, the teachings of the present disclosure can be applied for any services over Internet Protocol capable wireless or wire based networks, wherein providing softphone dialing from known locations is beneficial.

It should be noted that although the present disclosure describes various embodiments and examples using the terms "softphone client" or "softphone," the present disclosure is not so limited. In other words, any software client that can perform the functions or operations as discussed below will fall within the scope of the present disclosure even though the terms "softphone" client or "softphone" are not used. Said in yet another way, embodiments of the present disclosure can be deployed in any manner without being limited to a "softphone" client, e.g., embodiments of the present disclosure can be deployed within other types of software clients or software applications, in general.

As described above, when a user dials 911 for emergency services, a 911 or E911 system links the caller to a PSAP which has a jurisdiction over the location from which the call originates. The determination of the location depends on the information stored in an Automatic Location Information (ALI) database. In one embodiment, the ALI database may be maintained by a third party, on behalf of the local governmental agencies that provide emergency services. For example, an Incumbent Local Exchange Carrier (ILEC) may maintain the ALI database. In another embodiment, the management of the ALI database may further be subcontracted by the ILEC to an i2 provider, e.g. Intrado™, TeleCommunication Systems (TCS), and so on. The ALI database feeds address information to a Master Street Address Guide (MSAG) database. When a 911 call is originated by a user, the i2 provider uses the MSAG database to route the 911 call to the appropriate PSAP.

For example, if the call is from a traditional wire based phone, the network service provider sends the calling party number to the PSAP. The PSAP uses the calling party number to query the address from the ALI database. The calling party's phone number and the location of the caller may then be displayed for the PSAP operator. The calling party's phone number is also referred to as the call back number.

In another example, the call may be from a wireless endpoint device, e.g., a cell phone. If the call is from a wireless endpoint device, the ALI provides a latitudinal & longitudinal coordinate determined in accordance with a Phase I or a Phase II requirement specified by the U.S. Federal Communications Commission (FCC). Phase I location identification refers to an identification of a location of a cell sector or an E-TRAN Cell Global Identifier (eCGI) used for a 911 call that is originated, within six minutes of a request for the location by the PSAP. Phase II location identification refers to an identification of a location of a calling device, in terms of the calling device's latitudinal & longitudinal coordinates. The latitudinal & longitudinal coordinates may be determined via an Assisted Global Positioning System (AGPS) or an Uplink Time Difference of Arrival (UTDOA).

As described above, the softphone capability of the present disclosure enables a voice over LTE or video over LTE user to access services by using a softphone client from a personal computer (PC) or a computing tablet. For example, the user may be a subscriber of a VoLTE service with a mobile handset, a qualified rate plan, or a mobile phone number. In one embodiment, the mobile handset is a Voice over LTE (IR.92 standard) compatible handset. In another embodiment, the mobile handset is a Video over LTE (IR.94 standard) compatible handset and so on.

The softphone client for the personal computer may comprise any web browser based client. For example, the web browser based client may be accessible from a browser such as Internet Explorer, Safari, Google Chrome, Firefox, etc. The softphone client for the computing tablet may comprise any device resident client. For example, the softphone client for the computing tablet may be supported on Apple® tablets, Android® tablets, etc. The softphone client acts as an extension to the VoLTE mobile handset. As such, the softphone client is not assigned its own telephone number. Rather, the softphone client uses the VoLTE subscriber's mobile telephone number.

In one embodiment, the present method supports a predetermined number of simultaneous registrations of softphone clients per user. For example, the method may support five (5) simultaneous registrations of softphone clients for each user. The number of softphone clients to be supported is determined by the network service provider and is not a limiting parameter of the present disclosure.

As described above, softphone clients lack radio access network (RAN) technologies that are required for phase I or phase II location identification. Accordingly, regulatory bodies have defined the softphone clients under voice over internet protocol (VoIP) over wireline jurisdictions. As such, the softphone clients are treated as VoIP nomadic clients. This is the case, even if the softphone client is receiving its data access via a Commercial Mobile Radio Service (CMRS) signal (e.g., client on a Long Term Evolution (LTE) User Equipment (UE), tablet, etc.), and/or residing on a Subscriber Identity Module (SIM)-based device.

Since the softphone clients are treated as VoIP/wireline clients by the regulatory authorities, an Enhanced 911 (E911) support is required only if the softphone clients are fully interconnected endpoints to the Public Switched Telephone Network (PSTN). A network service provider may provide the user of a fully interconnected endpoint to the PSTN an ability to provide, to the network service provider, an address associated with the user's physical location while using the endpoint. Subsequently, if the user dials an emergency number, e.g., 911, from the endpoint device, the network service provider may provide the address associated with the user's physical location, in the 911 call request. The 911 call request is then routed from the network service provider towards the emergency service provider, e.g., the PSAP.

It is important to note that the network service provider is not required to validate the address provided by the user or to ensure that that the address is current. The service provider's responsibility is to allow the user to provide a current address from the device at any time, to validate that an emergency service can be provided for the address that is provided by the user, and to signal the address information if a 911 call is placed from the device.

In one embodiment, the present method treats the softphone clients as fully interconnected endpoints to the PSTN. Accordingly, if the user dials 911, the network service provider provides the location information in the 911 call request directed towards the PSAP.

In order to provide the location information to the PSAP, the method first needs to determine the location information either prior to the call or during the call. In one embodiment, the method of the present disclosure relies upon the user to provide a street address for the current location from which the service is being accessed prior to the call. The method allows the user to perform registration with the network service provider, e.g., Session Initiation Protocol (SIP) registration, only if the softphone client is being used from a location known to have the 911 coverage. To ascertain such coverage, the user is provided with a mechanism (e.g., a web portal) to provide his or her postal address (or civic address).

When the user provides the postal address, the postal address is converted to a Master Street Address Guide (MSAG) address by the network service provider system or the i2 provider system. The MSAG address is then stored in the National Emergency Number Administration (NENA) i2 Provider Location Information Server (LIS) server. The MSAG address is used by the i2 provider to map the address to a particular PSAP that serves the current location of a corresponding 911 call.

In one embodiment, the method of the present disclosure enables one or more addresses from which the service is being accessed via a softphone client to be stored on the softphone client. In one embodiment, the method also creates a specific address identifier for each address that is provided by the user. The network service provider then sends each address and its corresponding address identifier to an i2 provider. The i2 provider validates the emergency services coverage for each address. For each particular address of the plurality of addresses, the validation is performed prior to allowing the user to use the softphone from the particular address.

In one example, the address may be successfully validated as having coverage for the E911 service. The i2 provider then notifies the network service provider of the successful validation. If the address is successfully validated, the network service provider and the i2 provider will store the address. In addition, the network service provider sends back the address identifier to the softphone client for storage.

In another example, the address may not be served by an E911 service. In this case, the address validation fails. If the validation fails, then the i2 provider notifies the network service provider. In turn, the network service provider will notify the user of the failure. The user is then prevented from accessing the VoLTE service from that location. Alternatively, the user may move to another location to attempt to access the VoLTE service via the softphone client.

In operation, when the user attempts to access the service via the softphone client, the user must first establish that he or she is located at an address with a 911 service coverage. Establishing that the user is located at an address with 911 service coverage may be accomplished either by confirming that he or she is located at an address that was previously validated, or by providing an address that can then be validated prior to being allowed to proceed with registration with the network service provider. For example, a SIP registration may be permitted only after establishing that the user is accessing the VoLTE service from a location that is validated as having coverage for the 911 service.

In one embodiment, if the address is successfully validated, the softphone client sends the address and the address identifier to the network service provider's web security function for storage. For example, the softphone client may send the address identifier to the IP Multimedia Subsystem (IMS) Web Security Function (IWSF) of the network service provider. Storing the address identifier with the network service provider's IWSF enables the user to access the previously validated addresses and their respective address identifiers across the user's multiple devices.

In one embodiment, the network service provider determines the number of address identifiers and corresponding validated addresses to be stored for each user. For example, the network service provider may store five address identifiers and corresponding validated addresses per user.

Subsequently, if the user dials 911 from via a dialer of the softphone client, from a validated address, the softphone client will include the address identifier in the call request. In one embodiment, the method uses Session Initiation Protocol (SIP) signaling for call control. For example, the address identifier may be included in a Private Access Network Information (P-ANI) parameter of a SIP INVITE message that is sent from the softphone for the E911 call. The address identifier may be encoded using the P-ANI access type "IEEE-802.11b."

Figure 1:
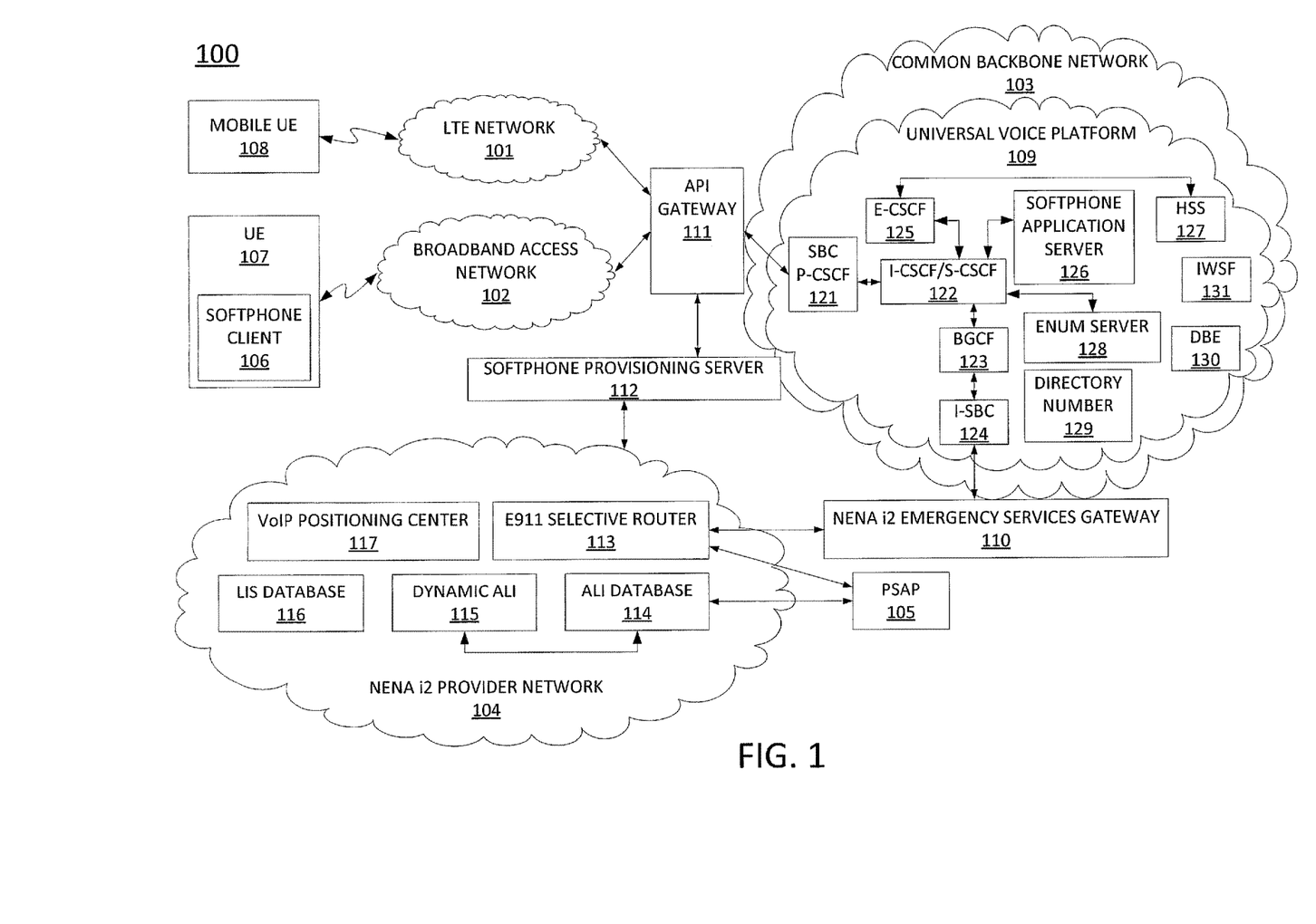
FIG. 1 illustrates an example network related to the present disclosure.

FIG. 1 illustrates an example network 100 related to the present disclosure. In one illustrative embodiment, the network 100 comprises an LTE network 101, a broadband access network 102, a common backbone network 103, a National Emergency Number Administration (NENA) i2 provider network 104, a PSAP 105, a softphone client 106 deployed in a user endpoint (UE) device 107, and a mobile user endpoint device 108.

The user endpoint device 107 can be a mobile device, e.g., a smart phone, a cellular phone, a laptop computer, or a computing tablet, or a non-mobile device, e.g., a desktop computer or a household appliance, for accessing network services via the LTE network 101. The softphone client 106 is used in UE 107 to access VoLTE services via the broadband access network 102 and the core backbone network 103.

In one example, the common backbone network 103 comprises a universal voice platform 109, a NENA i2 Emergency Services Gateway (NENA i2 ESGW) 110, an Application Programming Interface Gateway (API GW) 111, a Softphone Provisioning Server (SPS) 112, and other network elements.

In one example, the universal voice platform 109 comprises a Session Border Controller/Proxy-Call Session Control Function (SBC/P-CSCF) 121, an Interrogating-Call Session Control Function/Serving-Call Session Control Function (I-CSCF/S/CSCF) 122, a Breakout Gateway Control Function (BGCF) 123, an Interrogating-Session Border Controller (I-SBC) 124, an Emergency-Call Session Control Function (E-CSCF) 125, a softphone Application Server (AS) 126, a Home Subscriber Server (HSS) 127, a tElephone NUmber Mapping (ENUM) server 128, a Directory Number (DN) server 129, a Data Border Element (DBE) 130, an IMS Web Security Function (IWSF) 131, and the like.

It should be noted that although various networks and network elements are shown separately in FIG. 1, it is possible that functions performed by these networks and network elements can be combined into fewer networks and/or network elements, or expanded into a greater number of networks and/or network elements depending on the deployment requirements. It should also be noted that the above illustrated network 100 is only illustrative and the number of network components or elements are not specifically limited as shown. Any number of network components or elements can be deployed. For example, there may be several networks and any number of network elements may be deployed in each of the networks.

In one example, the NENA i2 provider network 104 comprises an E911 Selective Router (SR) 113, an Automatic Location Identification (ALI) database 114, a dynamic ALI database 115, a Location Information Server (LIS) database 116, and a Voice over Internet Protocol (VoIP) Positioning Center (VPC) 117, and so on.

In one example, the API GW 111 is responsible for user verification and authentication, for interacting with network security functions, application authentication, generating authorization codes, managing access tokens and passwords, and similar functions. In one example, the SPS 112 is responsible for interfacing with the i2 provider network 104 on behalf of the softphone clients, e.g., the softphone client 106.

In one example, the NENA i2 ESGW 110 is used to communicate with the E911 SR 113 located in the NENA i2 provider network 104. For example, when a 911 call is received by the universal voice platform 109, the call is ultimately routed from the universal voice platform 109 towards a PSAP 105 via the NENA i2 ESGW 110 and the E911 SR 113. The E911 SR 113 is responsible for selectively routing 911 calls to an appropriate PSAP, e.g., to PSAP 105.

Traffic to and from the user endpoint device 107 reaches the common backbone network 103, via the API GW 111 and the broadband access network 102. Similarly, traffic to and from the mobile user endpoint device 108 (also employing a softphone client 106) may reach the common backbone network 103, via the API GW 111 and the LTE 101.

When the user provides to the softphone 106 a new address, the softphone will send a request for verification of coverage for emergency, e.g., 911 service, to the SPS 112, via the API GW 111. The SPS 112 is responsible for handling the verification request from the softphone 106. The SPS 112 first generates a specific address identifier for each address that is provided by the user. The SPS 112 then sends the request to the NENA i2 provider network 104 with the specific address identifier.

When a response is received from the NENA i2 provider network 104, the SPS 112 determines whether the address is successfully validated. If the address is in a 911 coverage area, the SPS 112 will receive a response indicating a successful validation. If the validation is successful, the SPS 112 saves the address and the associated address identifier. The SPS 112 then sends the validated address and the associated address identifier to the softphone client 106. The softphone client 106 saves the validated address and the associated address identifier as a current location. The softphone client may then prompt the user if the address should also be saved as a default address. If a response is received from the user indicating a preference to store the address as the default address, the softphone client 106 then saves the address as a default address. If the response is negative, the address is not saved as a default. However, the validated address remains as a current location.

If the address is not in a 911 coverage area, the response received by the SPS 112 from the i2 provider network 104 will indicate that the validation was not successful. The SPS 112 then sends the failure response to the softphone client 106. The softphone client 106 may then display an error message to the user indicating that the address in not in a 911 coverage area. The error message may also indicate to the user that the user needs to move to another location in order to use the softphone client. In addition, a prompt may be provided to enter another street address. If the user enters another address, the softphone client 106 will then send another request to the SPS 112, and so on.

If the user is able to use the softphone client 106 at the current location (i.e., the validation was successful), the softphone client 106 sends a request to the IWSF 131 for IMS information and previously stored street addresses. If the user has used one or more other softphone clients previously, the IWSF returns a list of street addresses, including the address just sent and a predetermined number of previously stored street addresses. If the user has never used a softphone client previously, the IWSF will save the current address and the address identifier and replies to the softphone with the list of street addresses containing only the address that was sent for the current interaction. For example, a user may have deployed softphone clients in three computers to be used at five different addresses. Over several logins via the various softphone clients, the SPS 112 may have generated five address identifiers, one for each address. Each of the five addresses may then have been saved at the IWSF 131. In which case, the list of street addresses may comprise the list of the last five previously stored addresses. It is important to note that the number of addresses to be kept and returned to a softphone client upon request is not limited to five or any other specific number. In one embodiment, the network service provider determines the number of previously stored addresses to be maintained, and to be provided to a softphone client upon request.

Once the IWSF 131 returns the list of street addresses, the softphone client 106 starts the SIP registration. Upon successful SIP registration, the user is able to use the softphone from the current location.

In one embodiment, the method also enables a list of previously validated street addresses to be displayed to the user. In one embodiment, the IWSF may return a list of previously validated addresses to the user when the softphone client is turned on. In one embodiment, the IWSF may return the list of previously validated addresses to the user upon request. The user may then select any one of the previously validated addresses as the address of the current location. This feature may be useful to reduce errors that may occur when users retype addresses. In addition, the number of validation requests sent to the i2 provider may be reduced. For example, a user may have previously validated several addresses, via other softphone clients. The user may then simply request from the IWSF the list of previously validated addresses to be displayed. The user may then select a previously validated address from the list for the softphone client that is currently being used.

Figure 3A:
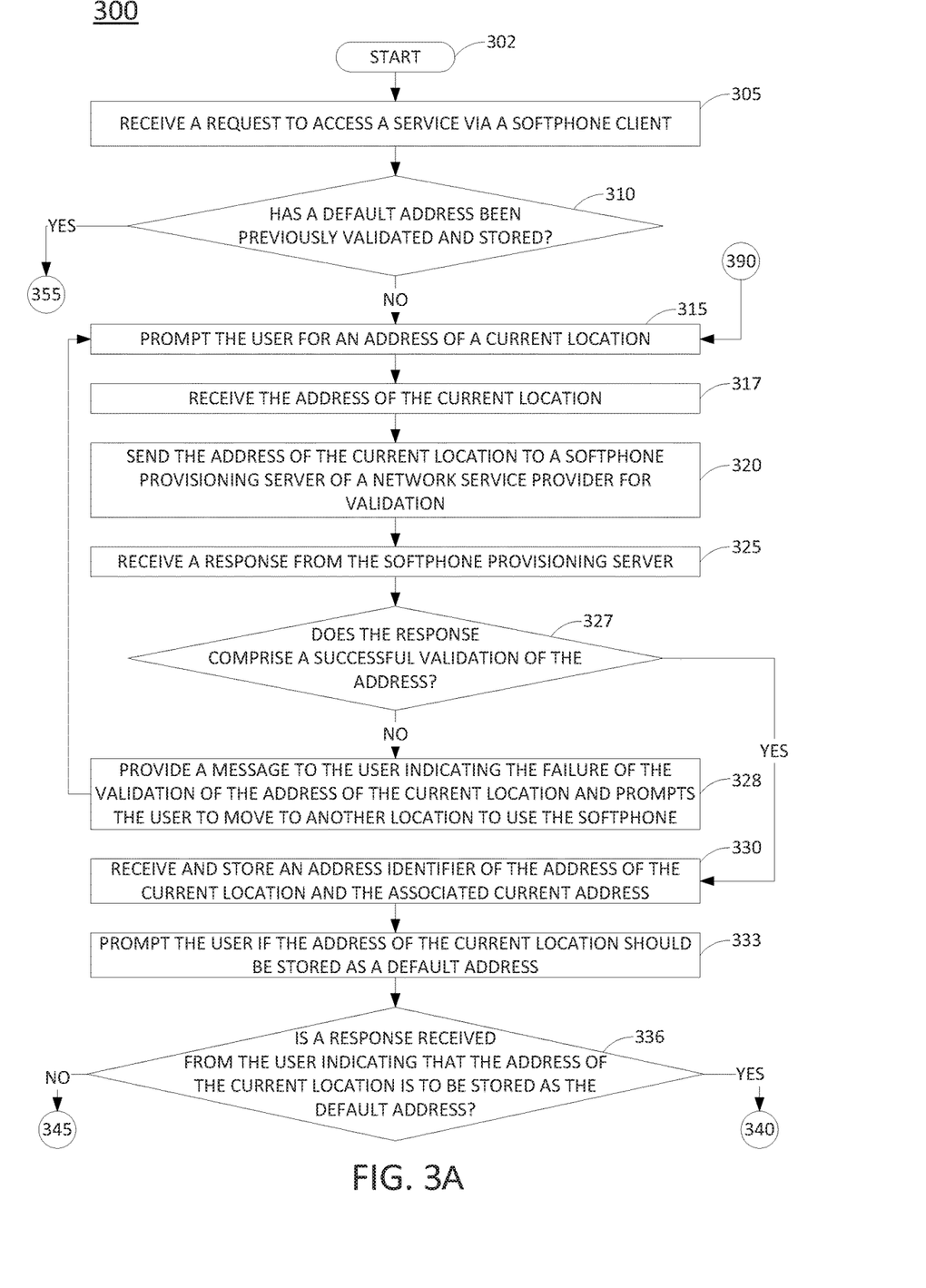

Subsequently, if the user dials 911 via the softphone client, the address identifier of the current location is included in the call request sent by the softphone client towards the common backbone network 103. The 911 call reaches the S-CSCF 122 assigned for the user. The operations performed for processing the 911 call, once it reaches the service provider network, are described below in FIG. 3.

In some scenarios, the 911 call may terminate before the emergency service is successfully dispatched to the caller. For example, the connection may be lost, etc. The PSAP operator may then wish to activate a call back feature of the PSAP. In order to increase the chance of a PSAP operator reaching the caller in a timely manner, the current method provides a distinct operating mode for 911 calls, e.g., 911 mode.

In one embodiment, the 911 mode of the present method enables the call back feature of the PSAP to simultaneously ring the user's mobile handset as well as all of the user's registered softphone clients for a predetermined period of time, e.g., for 15 minutes, 30 minutes and so on, after a 911 call is originated by the user. However, it should be noted that in one embodiment, the user may have registered different softphones with different addresses. Thus, it is possible to allow multiple calls from different softphones of the user to be routed to one or more appropriate PSAPs.

In one embodiment, the call back feature of the PSAP is supported by allowing all inbound calls for the user to be offered to all of the user's registered softphone clients and the mobile handset of the user for the predetermined period of time. For example, when the SIP INVITE message for the 911 call reaches the S-CSCF 122, the S-CSCF 122 may forward the SIP INVITE message to the softphone AS 126. The softphone AS 126 may then put the user in the 911 mode and start a 15 minute timer. All inbound calls before the expiration of the 15 timer are then offered to all registered softphone clients of the user as well as the user's mobile handset. The softphone AS 126 monitors to determine when the timer will expire. Upon expiration of the timer, the user is then taken out of the 911 mode, to return to a normal operating mode.

In some cases, the user may dial 911 via either the same or another softphone client before the timer associated with a first 911 call expires. If a second 911 call is originated by the user via any of the user's softphone clients and ends before the timer associated with a first 911 call expires, the method restarts the timer for another predetermined time period, e.g., another 15 minutes, when the timer associated with the first 911 call expires.

Figure 2:
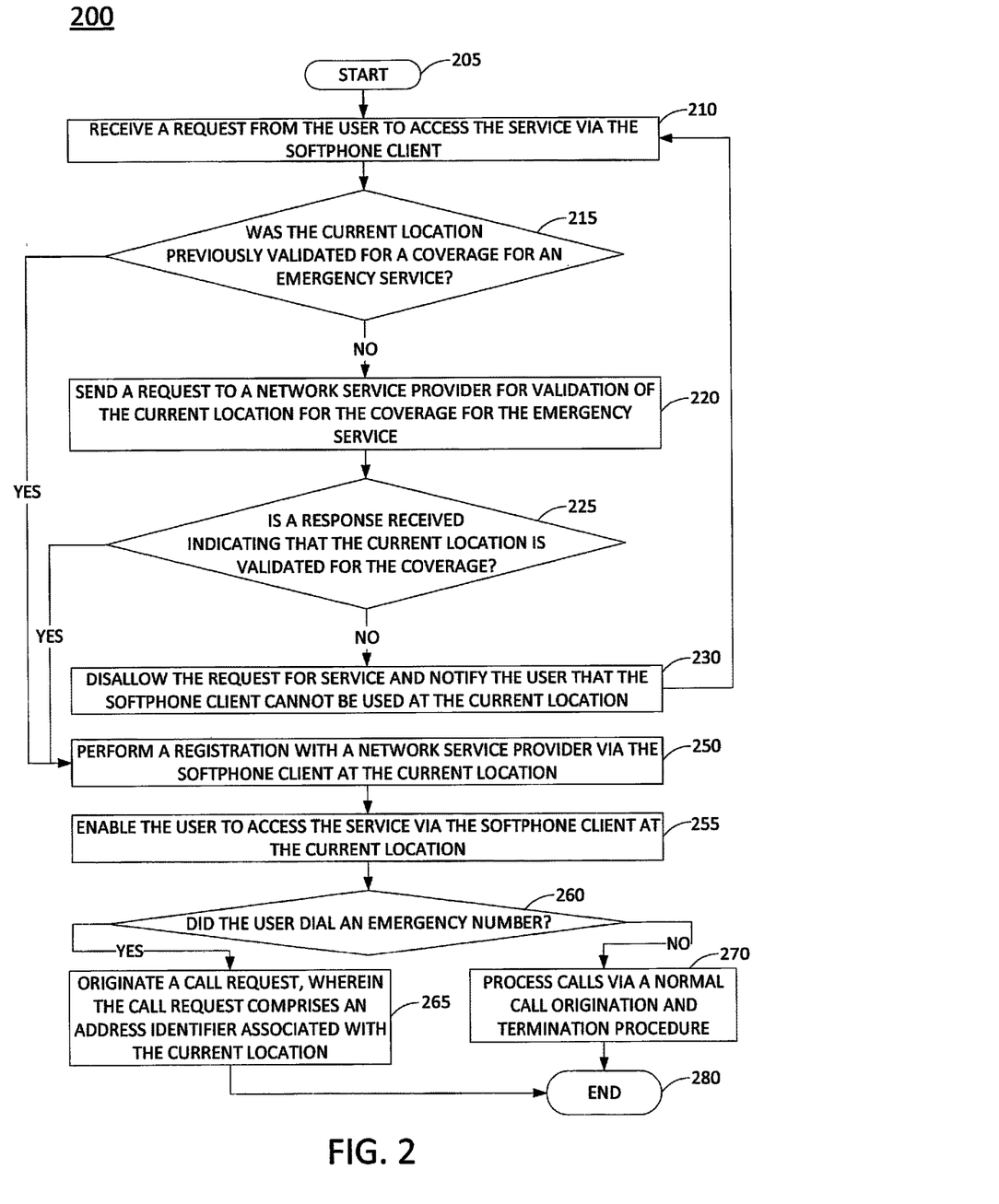
FIG. 2. Illustrates a flowchart of an example method for providing a service to a user at a current location via a software client, e.g., a softphone client.

FIG. 2. Illustrates a flowchart of a method 200 for providing a service to a user at a current location via a software client, e.g., a softphone client. In one embodiment, the method may be implemented in a softphone client that is deployed in a computer or a computing tablet, i.e., the method 200 can be executed by a processor (e.g., illustrated in FIG. 5) of the computer or the computing tablet. Method 200 starts in step 205 and proceeds to step 210.

In step 210, the processor receives a request from the user to access the service via the softphone client.

In step 215, the processor determines whether the current location was previously validated for a coverage for an emergency service. If the current location was previously validated for the coverage, the method 200 proceeds to 250. Otherwise, the method proceeds to step 220.

In step 220, the processor sends a request to a network service provider for validation of the current location for the coverage for the emergency service. For example, the processor sends the request to a softphone provisioning server of the network service provider.

In step 225, the processor determines whether a response is received, from the network service provider, indicating that the current location is validated for the coverage. For example, the softphone provisioning server may respond to the request as to whether the current location is validated. If the response is received indicating that the current location is validated for coverage, the method proceeds to step 250. Otherwise, the method proceeds to step 230.

In step 230, the processor disallows the request for service and notifies the user that the softphone client cannot be used at the current location, if the response indicating that the current location is validated for coverage is not received. For example, the softphone provisioning server may forward the request to the i2 provider, and the i2 provider may reply with a failure of the validation. The method then proceeds to step 210.

In step 250, the processor performs a registration with a network service provider via the softphone client at the current location, e.g., if either the response is received indicating that the current location is validated for the coverage or the current location was previously validated for the coverage.

In step 255, the processor enables the user to access the service via the softphone client at the current location. For example, the method may display a dialer. The user may then send and/or receive calls via the softphone.

In step 260, the processor determines whether the user dialed an emergency number, wherein the emergency number is a number dialed to reach the emergency service. If the user has dialed an emergency number, the method proceeds to step 265. Otherwise, the method proceeds to step 270.

In step 265, the processor originates a call request, wherein the call request comprises an address identifier associated with the current location, when the user dials the emergency number. The method then proceeds to step 280 to end processing the current request.

In step 270, the processor processes calls via a normal call origination and termination procedure. For example, if the user dialed a phone number other than the emergency number to reach the emergency services, the processor may originate a call request that does not include the address identifier. The method then proceeds to step 280 to end processing the current request.

Figure 3B:
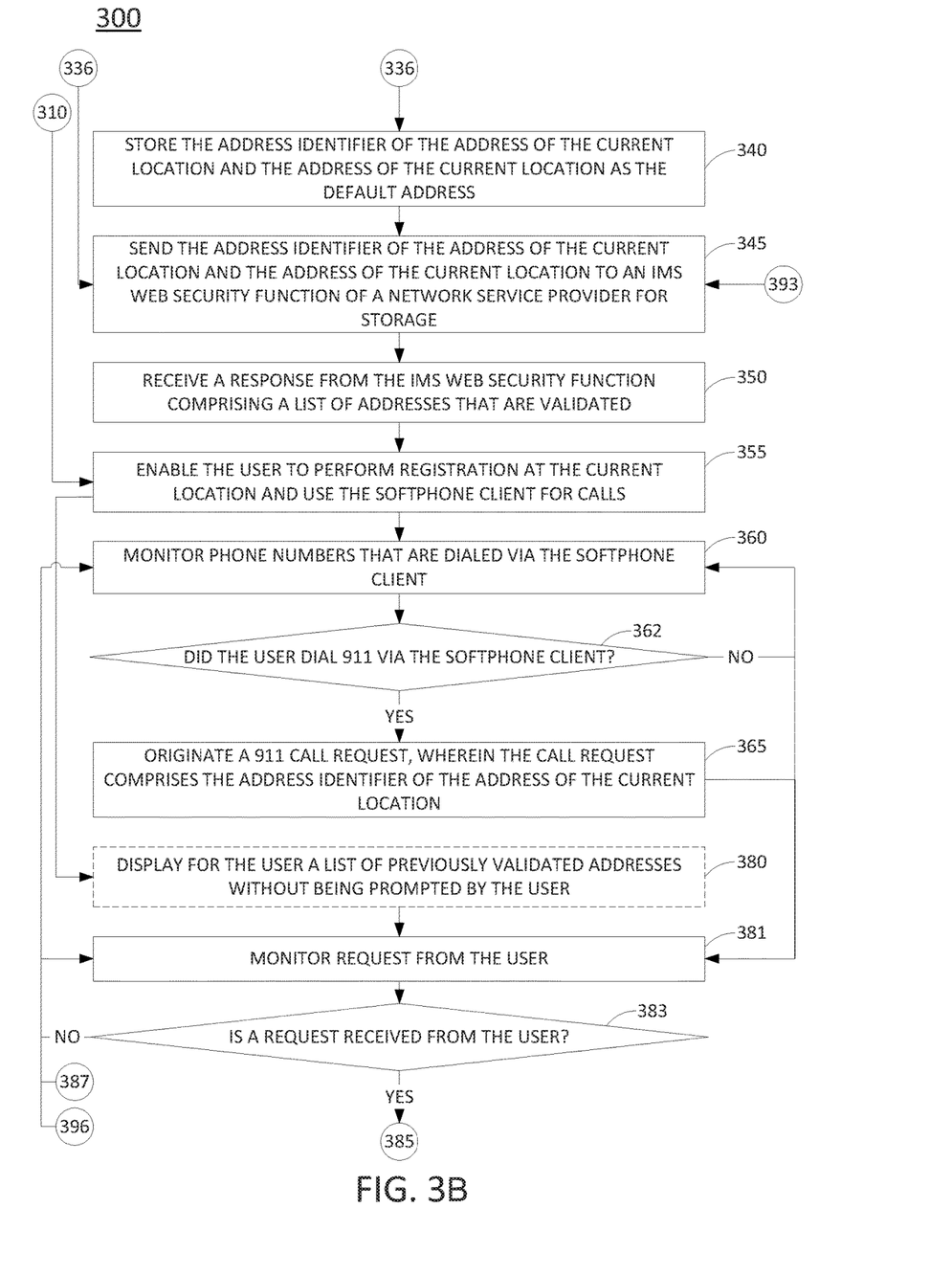
Figure 3C:
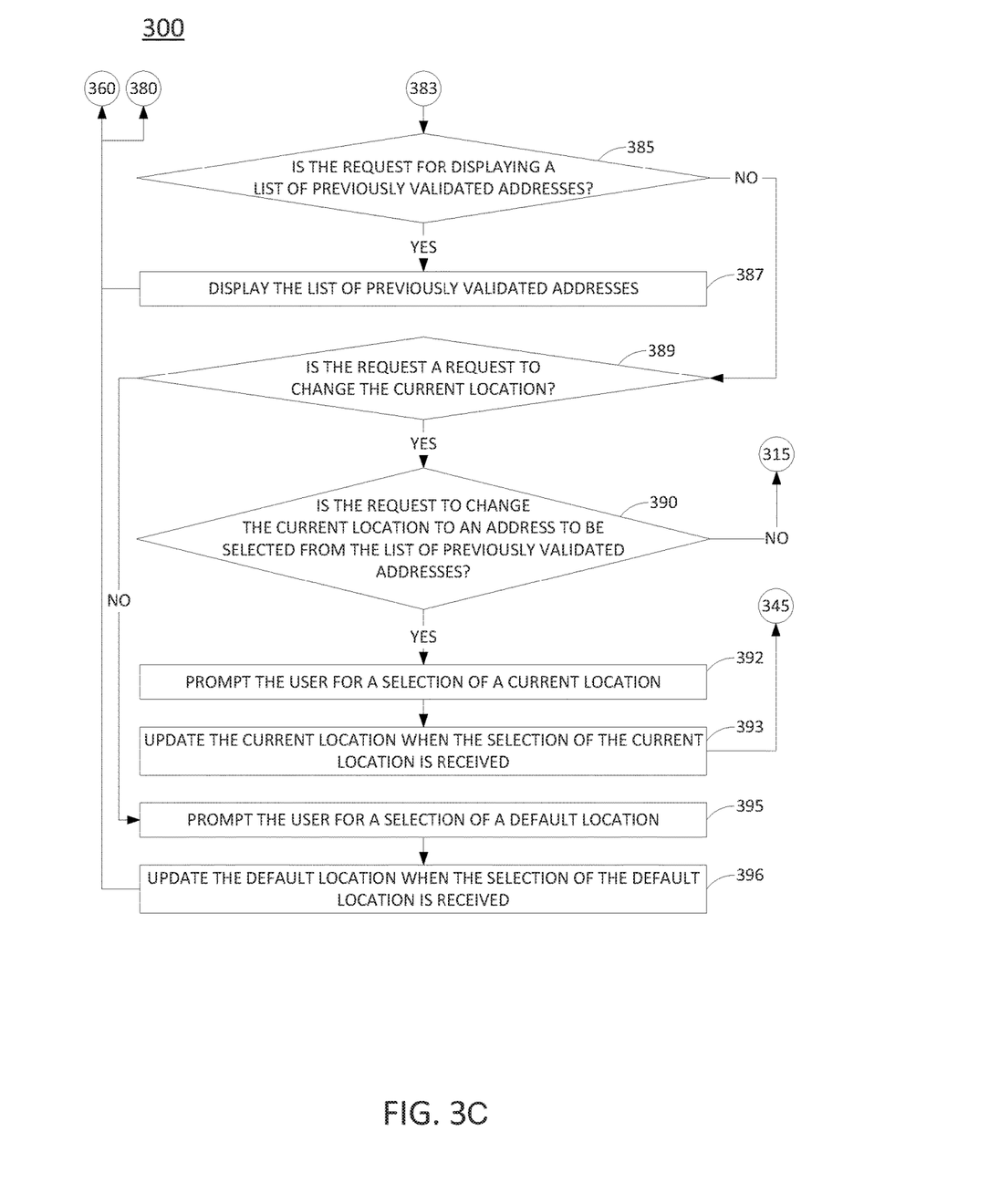

FIG. 3 illustrates a detailed flowchart of a method 300 of the present disclosure for providing a service to a user at a current location via a softphone client. For example, the method 300 is a more detailed flowchart of an illustrative embodiment of the method 200, described above. In one embodiment, the method 300 may be implemented in a softphone client that is deployed in a computer or a computing tablet, i.e., the method 300 can be executed by a processor (e.g., illustrated in FIG. 5) of the computer or the computing tablet. Method 300 starts in step 302 and proceeds to step 305.

In step 305, the processor receives a request to access a service via a softphone client. For example, the user attempts to login, perform a SIP registration, and access a VoLTE service via a softphone client.

In step 310, the processor determines whether a default address has been previously validated and stored. If a default address has been previously validated and stored, the method proceeds to step 355. Otherwise, the method proceeds to step 315.

In step 315, the processor prompts the user for an input as to an address of a current location (e.g., a street address to be used for potential 911 calls). For example, the softphone may display a prompt to the user such that the user enters the address that the user is currently located.

In step 317, the processor receives the address of the current location as a reply to the prompt. For example, the user enters a new street address.

In step 320, the processor sends the address of the current location received from the user to a softphone provisioning server (SPS) of a network service provider for validation. The SPS may then generate an identifier for the address of the current location. The SPS then queries an i2 provider for validation of the address of the current location for an E911 coverage. The query that is sent to the i2 provider comprises both the address of the current location and the corresponding address identifier that was generated by the SPS. The i2 provider stores the address of the current location and the corresponding address identifier. Then, the i2 provider then performs the validation of the address of the current location for the E911 coverage. For example, the i2 provider determines whether or not the address of the current location is in a 911 coverage area served by a particular PSAP. If the address is successfully validated, the SPS receives a response from the i2 provider indicating that the current address is in a 911 coverage area. Otherwise, the SPS receives a response from the i2 provider indicating the failure of the validation.

In step 325, the processor receives a reply from the SPS of the network service provider. For example, the processor receives a reply that comprises either a successful validation of the address of the current location or an indication for a failure of validation of the address of the current location.

In step 327, the processor determines whether the reply comprises a validation of the address. If the reply comprises a validation of the address, the method proceeds to step 330. Otherwise, the method proceeds to step 328.

In step 328, the processor provides a message to the user indicating the failure of the validation of the address of the current location and prompts the user to move to another location to use the softphone. For example, the softphone may display a message indicating that there is no 911 coverage at the current location and the user needs to move to another location to use the softphone. Thus, the request for accessing a service is denied. The method then proceeds to step 315.

In step 330, the processor receives and stores an address identifier of the address of the current location and the associated current address. For example, the softphone client receives from the SPS the current address that is validated and the identifier that was generated by the SPS.

In step 333, method 300 prompts the user whether the address of the current location should be stored as a default address. For example, the softphone client asks the user whether the user wishes to store the street address of the location from which the user is accessing services as the default address. For example, storing the current address as the default address may be used to enable the method 300 to proceed from step 310 to step 355 on subsequent registrations from the same location.

In step 336, the processor determines whether a response is received from the user indicating that the address of the current location is to be stored as the default address. If a response is received indicating that the address of the current location is to be stored as the default address, the method proceeds to step 340. Otherwise, the method proceeds to step 345.

In step 340, the processor stores the address identifier of the address of the current location and the address of the current location as the default address. The method then proceeds to step 345.

In step 345, the processor sends the address identifier of the address of the current location and the address of the current location to an IMS web security function of a network service provider for storage. For example, the IMS web security function may keep a predetermined number of previously validated addresses and their respective address identifiers for the user such that the user is able to access the previously validated addresses via any of his/her softphone clients. The access to previously validated addresses allows errors in entering street addresses to be reduced. In addition, the number of validation requests to be sent to i2 provider is advantageously reduced.

In step 350, the processor receives a response from the IMS web security function comprising a list of addresses that are validated. For example, the processor receives a response from the IMS web security function that includes a list of previously validated addresses. If the address of the current location is newly provided to the IMS web security function, the list also comprises the newly validated address.

In step 355, the processor enables the user to perform registration, e.g., SIP registration, at the current location. The user is then able to access the service via the softphone client from the current location. The method then proceeds to steps 360 and 380.

In step 360, the processor monitors phone numbers that are dialed via the softphone client. In step 362, the processor determines whether the user dialed 911 via the softphone client. If the user dials 911, the method proceeds to step 365. Otherwise, the method proceeds to steps 360 and 381.

In step 365, the processor originates a 911 call request, wherein the call request comprises the address identifier of the address of the current location. For example, the softphone client originates a SIP INVITE message directed towards the network service provider with the P-ANI set to the address identifier of the current location. The method then proceeds to steps 360 and 381.

In an optional step 380, the processor displays for the user a list of previously validated addresses without being prompted by the user. The user may then select, at any time, the current location to be an address selected from the list of previously validated addresses that is displayed.

In step 381, the processor monitors requests from the user. In step 383, the processor determines whether a request is received from the user. For example, a request may comprise one or more of: a request to display a list of previously validated addresses, a request to change the current location, and/or a request to perform an update as to a default location, may be received. If a request is received from the user, the method proceeds to step 385. Otherwise, the method proceeds to steps 360 and 381 to continue monitoring.

In step 385, the processor determines whether the request is for displaying a list of previously validated addresses. If the request is to display the list of previously validated addresses, the method proceeds to step 387. Otherwise, the method proceeds to step 389.

In step 387, the processor displays the list of previously validated addresses. The method then returns to steps 360 and 381 to continue monitoring.

In step 389, the processor determines whether the request is a request to change the current location. If the request is to change the current location, the method proceeds to step 390. Otherwise, the method proceeds to step 395.

In step 390, the processor determines whether the request is to change the current location to an address to be selected from a list of previously validated addresses. If the request is to change the current location to an address to be selected from the list of previously validated addresses, the method proceeds to step 392. Otherwise, the method proceeds to step 315.

In step 392, the processor prompts the user for a selection of a current location. For example, the processor may prompt the user to choose from a displayed list of previously validated addresses. In step 393, the processor updates the current location when the selection of the current location is received. The method then proceeds to step 345.

In step 395, the processor prompts the user for a selection of a default location. In step 396, the processor updates the default location when the selection of the default location is received. The method then proceeds to steps 360 and 381 to continue monitoring.

Figure 4A:
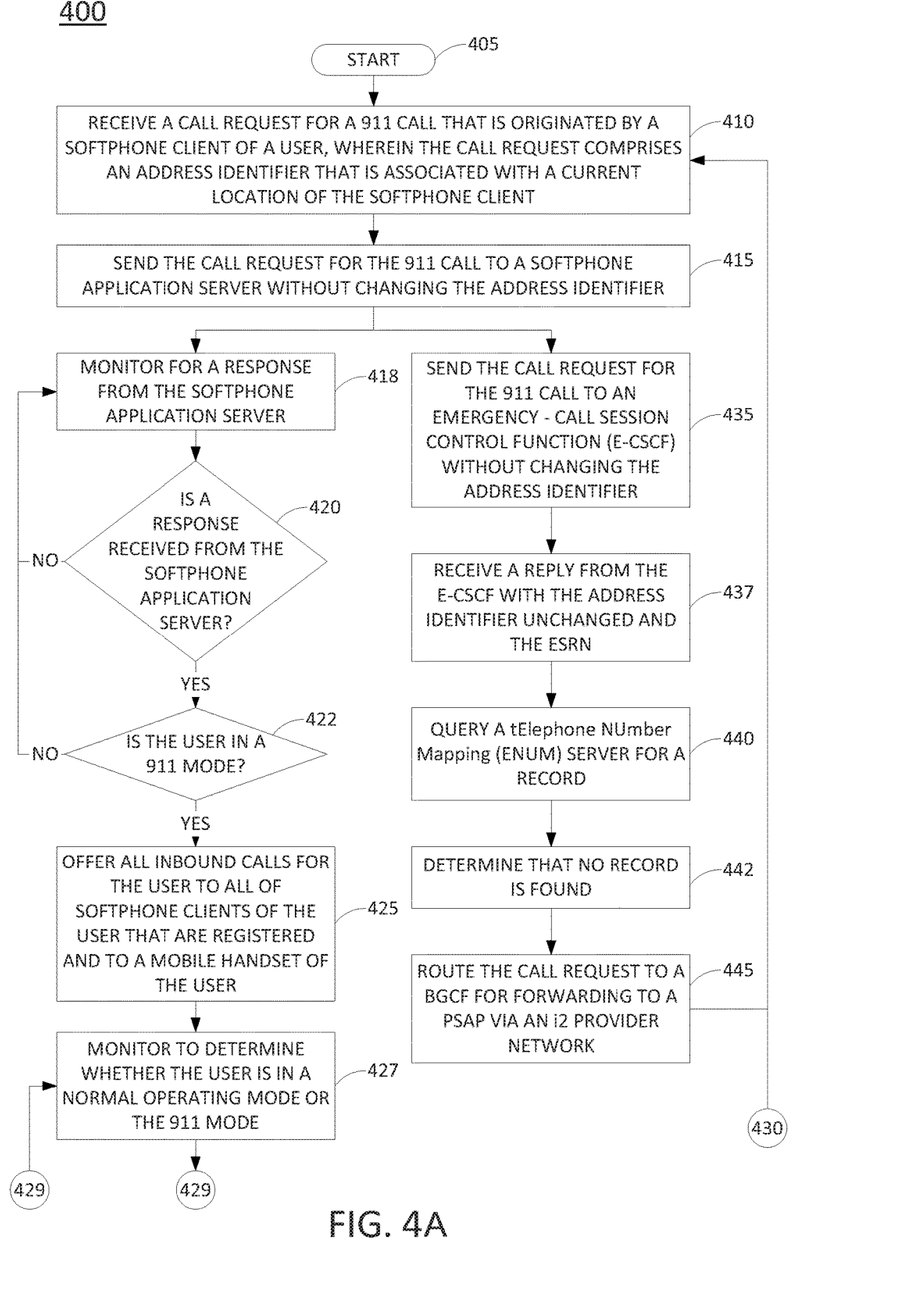
Figure 4B:
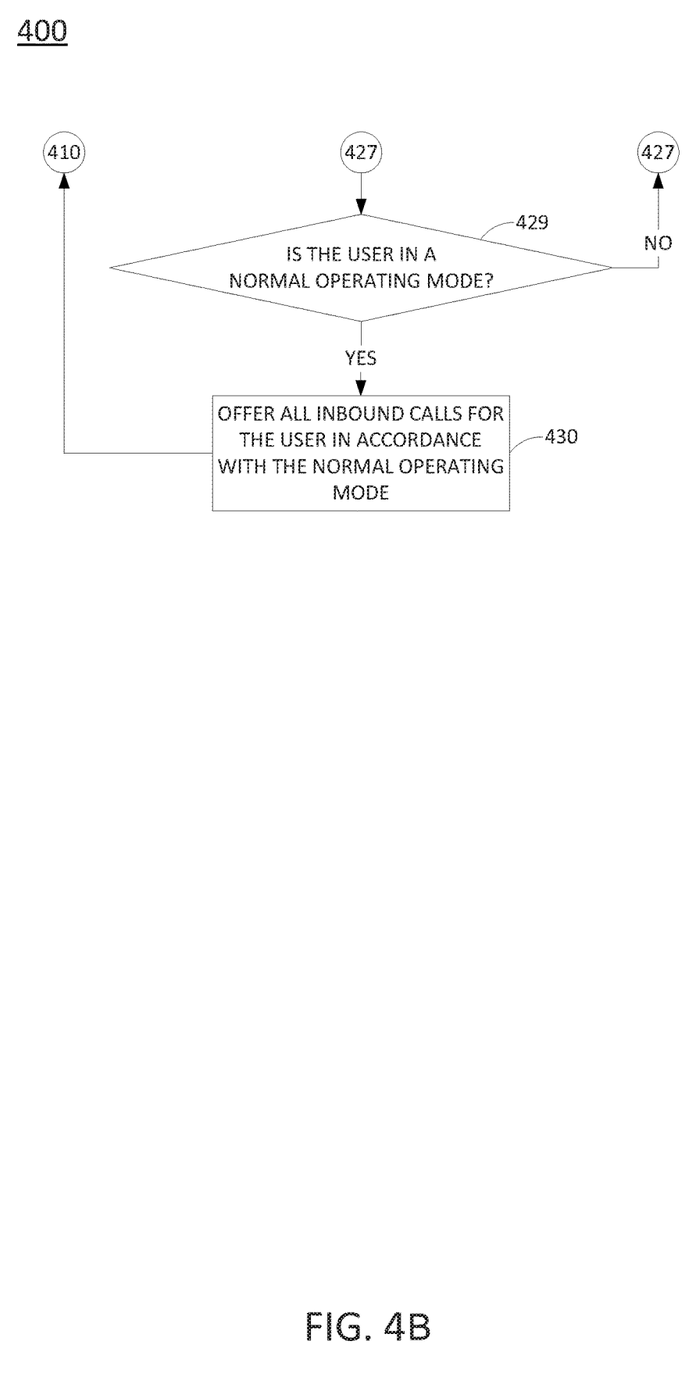
Figure 5:
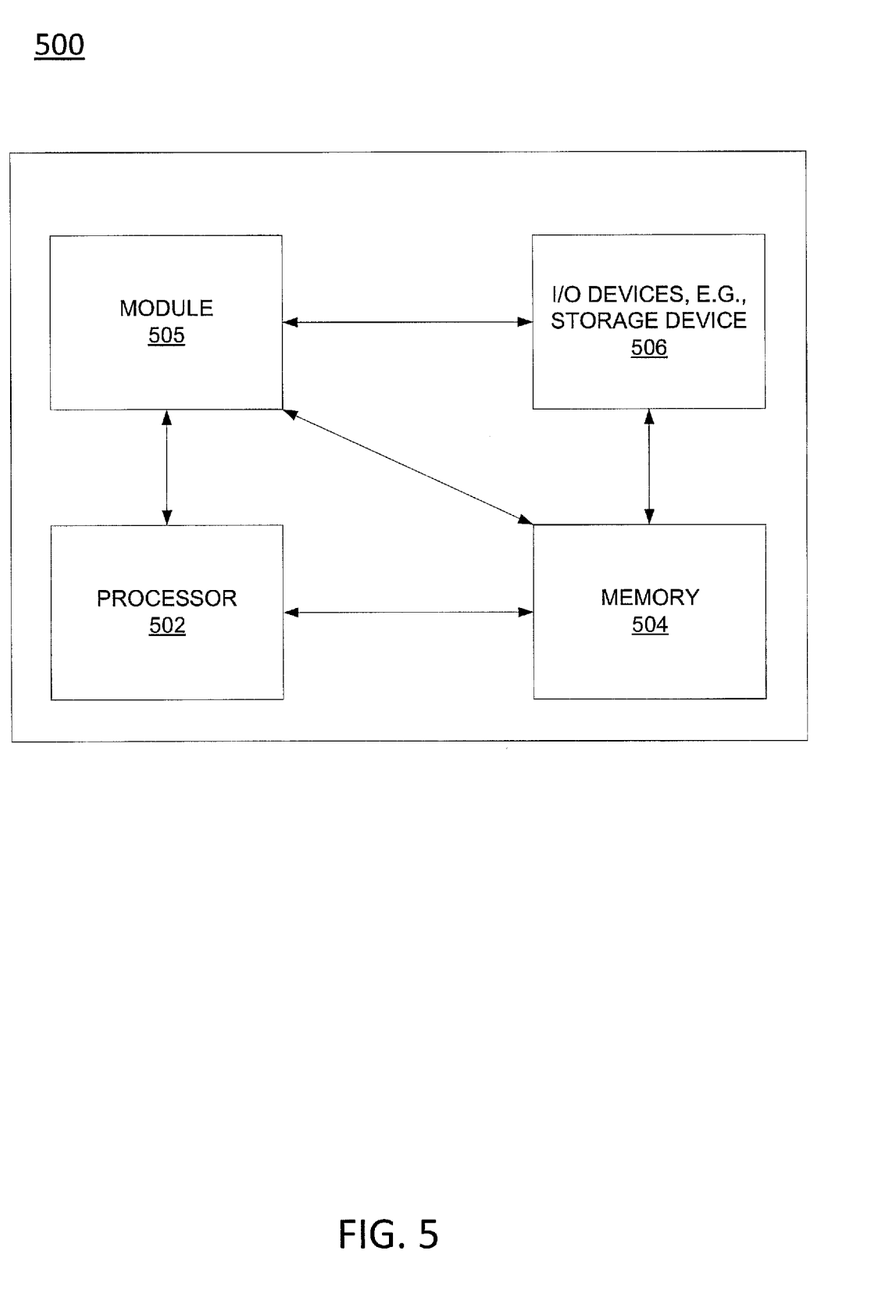
FIG. 5 depicts a high-level block diagram of a computer suitable for use in performing the functions described herein.

FIG. 4 illustrates a flowchart of a method 400 of the present disclosure for processing 911 calls by a network service provider. For example, the method 400 may be implemented in a universal voice platform that supports VoLTE or video or LTE services. Although, the functions performed in the voice platform are illustrated in FIG. 1 via several servers, the functions may be combined or distributed to be performed by any number or type of servers. In one embodiment, method 400 may be implemented in an S-CSCF, i.e., via a processor, e.g., as illustrated in FIG. 5 below. Method 400 starts in step 405 and proceeds to step 410.

In step 410, the processor receives a call request for a 911 call that is originated by a softphone client of a user, wherein the call request comprises an address identifier that is associated with a current location of the softphone client. For example, the user may dial 911 via the softphone client. The softphone client sends a SIP INVITE message with the P-ANI of the SIP INVITE message set to the address identifier of a current location. In one embodiment, an S-CSCF of the universal voice platform that is assigned for the user may receive the SIP INVITE message with the P-ANI set to the address identifier of the current location from which the user is accessing the VoLTE or video over LTE service.

In step 415, the processor sends the call request for the 911 call to a softphone application server without changing the address identifier. For example, the S-CSCF may process the call request to determine that the call request is for a 911 dialed number. Since the dialed number is 911, the S-CSCF keeps the P-ANI unchanged, sets an indication to a value that allows 911 calls to go through regardless of a failure of a softphone application server, and forwards the SIP INVITE message to the softphone application server. The method then proceeds to steps 418 and 435. Since the call is to be forwarded towards the PSAP regardless of a failure of the softphone application server, steps 418-430 and 435-445 may be performed in parallel.

In step 418, the processor monitors for a response from the softphone application server. If the softphone application server is not in a failure scenario, the softphone application server processes the call request, puts the user's status in a 911 mode, and starts a timer, e.g., a 15 minute timer, for having all inbound calls offered to all registered softphone clients of the user as well as the user's mobile handset. The softphone application server monitors to determine when either the timer expires or another 911 call is originated via any of the user's softphone clients. If the timer expires and no other 911 call is received, the application server returns the user's status from the 911 mode back to a normal operating mode. If another 911 call is received prior to the expiration of the timer, the timer is restarted at the end of the 15 minute timer, for another predetermined time period.

In step 420, the processor determines whether a response is received from the softphone application server. If a response is received, the method proceeds to step 422. Otherwise, the method proceeds to step 418.

In step 422, the processor determines whether the user's status is in a 911 mode. If the user's status is in a 911 mode, the method proceeds to step 425. Otherwise, the method proceeds to step 418.

In step 425, the processor offers all inbound calls for the user to all of softphone clients of the user that are registered and to a mobile handset of the user. In step 427, the processor monitors to determine whether the user's status is in a normal operating mode or the 911 mode. In step 429, the processor determines whether the user's status is in a normal operating mode. If the user is in a normal operating mode, the method proceeds to step 430. Otherwise, the method proceeds to step 427.

In step 430, the processor offers all inbound calls for the user in accordance with the normal operating mode. The method then proceeds to step 410.

In step 435, the processor sends the call request for the 911 call to an Emergency-Call Session Control Function (E-CSCF) without changing the address identifier. For example, the S-CSCF may send the SIP INVITE message without changing the value of the P-ANI and invoke the E-CSCF to process the emergency call.

The E-CSCF queries the HSS for E911 parameters. The parameters comprise a parameter for an Emergency Services Routing Number (ESRN) and a parameter for indicating if a query to a Voice over Internet Protocol (VoIP) Positioning Center (VPC) is required. Since the softphone client does not require a VPC query, the parameter for indicating whether the VPC is required is set to "no." The E-CSCF then replaces the Request—Uniform Resource Identifier (R-URI) with the emergency services routing number. The E-CSCF returns the SIP INVITE message to the S-CSCF with the address identifier unchanged.

In step 437, the processor receives a reply from the E-CSCF with the address identifier unchanged and the ESRN. In step 440, the processor queries a tElephone NUmber Mapping (ENUM) server for a record. In step 442, the processor determines that no record is found. In step 445, the processor routes the call request to a BGCF for forwarding to a PSAP via an i2 provider network. The method then proceeds to step 410.

In one embodiment, the BGCF comprises translations for routing the 911 call to an emergency services gateway (ESGW) of the i2 provider network via an Interrogating-Session Border Controller (I-SBC). An E911 selective router of the i2 provider network extracts the P-ANI from the SIP INVITE message and geocodes the address to a coverage area of a PSAP. The call is then forwarded to a VPC of the i2 provider network. The VPC determines the ESRN emergency services query key (ESQK) for the PSAP, populates the called party number (CdPN) with the ESRN, populates the calling party number (CgPN) with the ESQK, and routes the call to the i2 ESGW.

In one embodiment, the ESGW has translations to route the ESRN to the appropriate PSAP trunk group on an E911 selective router (E911 SR) trunk. The ESGW signals the call to the E911 SR based on the trunk type, using 911 as the CdPN and the P-Asserted Identity (PAI) as the CgPN. PAI refers to caller id information for a call that is included in the SIP INVITE message. For example, the trunk type may be an ISDN User Part (ISUP) or a Multi Frequency-Centralized Automated Message Accounting (MF-CAMA).

Then, a bearer path is established between the endpoint device of the user and the softphone SBC/P-CSCF (IP), between the softphone SBC/P-CSCF and the I-SBC, and between the I-SBC and ESGW to the E911 SR of the PSAP. The PSAP queries the Automatic Location Identification (ALI) for the record belonging to the CgPN (ESQK). The ALI has a shell record associated with the ESQK which steers to the dynamic ALI (dALI) of the VPC. The dALI retrieves the dALI record and provides to the ALI the address and the call back number. The caller's information is then displayed to the call taker (operator of the emergency service) of the PSAP.

As such, the present disclosure provides at least one advancement in providing a 911 service to a user via a softphone client. This advancement is in addition to the traditional 911 service provided via a cell phone or a traditional phone. Viewed in another manner, the present disclosure enables an emergency service to be delivered to a current location of the user, while the user accesses VoLTE or video over LTE service via a softphone.

FIG. 5 depicts a high-level block diagram of a computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for providing a service to a user via a softphone client, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200, 300 or 400, as discussed above, is implemented in a distributed or parallel manner for a particular illustrative example, i.e., the steps of the above method 200, 300 or 400, or the entire method 200, 300 or 400, is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 505 for providing a service to a user via a softphone client (e.g., a software program comprising computer-executable instructions) can be loaded into memory 504 and executed by hardware processor element 502 to implement the steps, functions or operations as discussed above in connection with the exemplary method 200, 300 or 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for providing a service to a user via a softphone client (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for providing a non-emergency service to a user via a software client of an endpoint device, the method comprising:
  receiving, via a processor of the endpoint device, a request from the user to access the non-emergency service via the software client, wherein the non-emergency service comprises a voice over long term evolution network service;
  sending, via the processor, to a network service provider in response to receiving the request from the user to access the non-emergency service via the software client, a request for validation of a current location as to a coverage of an emergency service, when the current location was not previously validated for the coverage of the emergency service, wherein the processor is in communication with the network service provider via a non-cellular access network;
  determining, via the processor, whether a response is received, from the network service provider, indicating that the current location is validated for the coverage of the emergency service, wherein the response includes an address identifier associated with the current location for accessing the emergency service;
  performing, via the processor, a registration with the network service provider via the software client at the current location, when the response is received indicating that the current location is validated for the coverage of the emergency service; and
  enabling, via the processor, the user to access the non-emergency service via the software client at the current location when the registration is performed.

2. The method of claim 1, further comprising:
  determining, via the processor, whether an emergency number is dialed, wherein the emergency number is for accessing the emergency service; and
  originating, via the processor, a call request, wherein the call request comprises the address identifier associated with the current location, when the emergency number is dialed.

3. The method of claim 1, further comprising:
  sending, via the processor, a request for storage to a web security function of the network service provider, when the response is received indicating that the current location is validated for the coverage of the emergency service, wherein the request for storage comprises the current location and the address identifier associated with the current location.

4. The method of claim 3, further comprising:
  receiving, via the processor, a second response to the request for storage from the web security function, wherein the second response to the request for storage comprises a list of a previously validated address and a respective address identifier for the previously validated address, wherein the list of the previously validated address comprises at least one address that is validated for the emergency service.

5. The method of claim 1, further comprising:
  retrieving, via the processor, a list of a previously validated address from a web security function of the network service provider.

6. The method of claim 5, wherein the retrieving the list of the previously validated address from the web security function is performed when a request to retrieve the list of the previously validated address is received from the user.

7. The method of claim 5, further comprising:
  determining, via the processor, whether the current location was previously validated for the coverage of the emergency service by determining whether the current location comprises a location selected from the list of the previously validated address received from the network service provider.

8. The method of claim 5, further comprising:
  determining, via the processor, whether the current location was previously validated for the coverage of the emergency service by determining whether the current location comprises a default location that was previously validated.

9. The method of claim 1, wherein the current location is a location received as an input from the user.

10. The method of claim 1, further comprising:
  preventing, via the processor, the registration with the network service provider at the current location, when the response is received indicating that the current location is not validated for the coverage of the emergency service.

11. The method of claim 1, wherein the performing the registration with the network service provider comprises performing a session initiation protocol registration.

12. The method of claim 1, wherein the request for validation of the current location for the coverage of the emergency service is sent by the network service provider to an i2 service provider.

13. The method of claim 12, wherein the request for validation of the current location for the coverage of the emergency service sent by the network service provider to the i2 service provider comprises the address identifier associated with the current location.

14. The method of claim 12, wherein the response indicating that the current location is validated for the coverage of the emergency service comprises a response received by the network service provider from the i2 service provider.

15. The method of claim 12, wherein the i2 service provider stores the current location and the address identifier associated with the current location.

16. An apparatus for providing a non-emergency service to a user via a software client of the apparatus, the apparatus comprising:
 a processor; and
 a computer-readable storage device storing a plurality of instructions which, when executed by the processor, cause the processor to perform operations, the operations comprising:
  receiving a request from the user to access the non-emergency service via the software client, wherein the non-emergency service comprises a voice over long term evolution network service;
  sending to a network service provider in response to receiving the request from the user to access the non-emergency service via the software client, a request for validation of a current location as to a coverage of an emergency service, when the current location was not previously validated for the coverage of the emergency service, wherein the processor is in communication with the network service provider via a non-cellular access network;
  determining whether a response is received from the network service provider, indicating that the current location is validated for the coverage of the emergency service, wherein the response includes an address identifier associated with the current location for accessing the emergency service;
  performing a registration with the network service provider via the software client at the current location, when the response is received indicating that the current location is validated for the coverage of the emergency service; and
  enabling the user to access the non-emergency service via the software client at the current location when the registration is performed.

17. The apparatus of claim 16, the operations further comprising:
 determining whether an emergency number is dialed, wherein the emergency number is for accessing the emergency service; and
 originating a call request, wherein the call request comprises the address identifier associated with the current location, when the emergency number is dialed.

18. A non-transitory computer-readable storage device storing a plurality of instructions which, when executed by a processor of an endpoint device, cause the processor to perform operations for providing a non-emergency service to a user via a software client of the endpoint device, the operations comprising:
 receiving a request from the user to access the non-emergency service via the software client, wherein the non-emergency service comprises a voice over long term evolution network service;
 sending to a network service provider in response to receiving the request from the user to access the non-emergency service via the software client, a request for validation of a current location as to a coverage of an emergency service, when the current location was not previously validated for the coverage of the emergency service, wherein the processor is in communication with the network service provider via a non-cellular access network;
 determining whether a response is received from the network service provider, indicating that the current location is validated for the coverage of the emergency service, wherein the response includes an address identifier associated with the current location for accessing the emergency service;
 performing a registration with the network service provider via the software client at the current location, when the response is received indicating that the current location is validated for the coverage of the emergency service; and
 enabling the user to access the non-emergency service via the software client at the current location when the registration is performed.

* * * * *